US012769669B2

(12) United States Patent
Huang et al.

(10) Patent No.: US 12,769,669 B2
(45) Date of Patent: Oct. 20, 2026

(54) METHOD FOR STORAGE, ELECTRONIC DEVICE AND COMPUTER PROGRAM PRODUCT

(71) Applicant: Dell Products L.P., Round Rock, TX (US)

(72) Inventors: Liang Huang, Shanghai (CN); Yunfei Chen, Shanghai (CN); Xianlong Liu, Shanghai (CN)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 18/969,867

(22) Filed: Dec. 5, 2024

(65) Prior Publication Data

US 2025/0348435 A1 Nov. 13, 2025

(30) Foreign Application Priority Data

May 10, 2024 (CN) ......................... 202410578820.2

(51) Int. Cl.
*G06F 12/1018* (2016.01)

(52) U.S. Cl.
CPC ................................ *G06F 12/1018* (2013.01)

(58) Field of Classification Search
CPC ................................................ G06F 16/24537
USPC .......................................................... 707/747
See application file for complete search history.

(56) References Cited

U.S. PATENT DOCUMENTS

| | | | | |
|---|---|---|---|---|
| 8,627,005 | B1 | 1/2014 | Glade et al. | |
| 8,661,068 | B1 | 2/2014 | Seibel et al. | |
| 9,208,258 | B2 | 12/2015 | Spillane et al. | |
| 10,296,498 | B2 * | 5/2019 | Yang | G06F 16/21 |
| 11,093,169 | B1 * | 8/2021 | Shveidel | G06F 3/064 |
| 12,175,078 | B2 | 12/2024 | Watson et al. | |
| 2015/0039907 | A1 * | 2/2015 | Bowden | G06F 16/211 711/125 |
| 2021/0026541 | A1 | 1/2021 | Shveidel et al. | |
| 2021/0109827 | A1 | 4/2021 | Vokaliga et al. | |
| 2021/0216517 | A1 * | 7/2021 | Graefe | G06F 16/2246 |
| 2024/0163306 | A1 | 5/2024 | Ramakrishnan et al. | |
| 2024/0338260 | A1 | 10/2024 | Mcsweeney et al. | |
| 2024/0370551 | A1 | 11/2024 | Lourenco et al. | |

* cited by examiner

*Primary Examiner* — Muluemebet Gurmu
(74) *Attorney, Agent, or Firm* — BainwoodHuang

(57) ABSTRACT

Storage techniques involve determining a target bucket page corresponding to a target key in at least one bucket page by performing a hash operation on the target key of a read operation. Such techniques further involve determining whether a target address corresponding to the target key exists in a plurality of records included in the target bucket page. Such techniques further involve, in response to a determination that the target address exists in the plurality of records, returning a target value from a corresponding target entry page based on the target address. In this way, there is provided a key-value storage layout based on hash and balanced tree which optimizes an access path of data, so that a length of a page jump can be reduced significantly, and then contentions for pages from read/write operations are effectively alleviated, thereby improving the storage performance.

15 Claims, 8 Drawing Sheets

METHOD FOR STORAGE, ELECTRONIC DEVICE AND COMPUTER PROGRAM PRODUCT

CROSS-REFERENCE TO RELATED APPLICATION

This application claims priority to Chinese Patent Application No. CN202410578820.2, on file at the China National Intellectual Property Administration (CNIPA), having a filing date of May 10, 2024, and having "METHOD FOR STORAGE, ELECTRONIC DEVICE AND COMPUTER PROGRAM PRODUCT" as a title, the contents and teachings of which are herein incorporated by reference in their entirety.

TECHNICAL FIELD

Embodiments of the present disclosure relate generally to the field of storage, and more specifically, relate to a method, an electronic device, and a computer program product for storage.

BACKGROUND

A volume (also known as a storage volume) is a logically consecutive storage space in a storage system, which can contain files, directories, or other data. In the storage system, a key-value pair for a volume identifier (volume ID) and a storage status of a volume corresponding to the volume ID can be stored. The volume ID is configured to uniquely identify a certain volume in the storage system. The volume ID has a wide range of values, e.g., from 0 to 2^32, and has a limited count, e.g., 778K.

Volume management involves creation, removal, and updating. The storage status of the volume corresponding to the volume ID is statistical information about a usage of a volume space. Each volume ID indicates a storage status of a corresponding volume, for example, how much data has been written to the volume.

SUMMARY

Embodiments of the present disclosure provide a solution for storage that can reduce lengthy page jumps of related arts and alleviate contentions of read/write operations on pages, thereby improving the storage performance.

In a first aspect of the present disclosure, there is provided a method for storage, including: determining a target bucket page corresponding to a target key in at least one bucket page by performing a hash operation on the target key of a read operation. The method further includes: determining whether a target address corresponding to the target key exists in a plurality of records included in the target bucket page. The method further includes: in response to a determination that the target address exists in the plurality of records, returning a target value from a corresponding target entry page based on the target address.

In another aspect of the present disclosure, there is provided an electronic device including a processor and a memory coupled to the processor and having instructions stored thereon, wherein the instructions, when executed by the processor, cause the device to perform actions including: determining a target bucket page corresponding to a target key in at least one bucket page by performing a hash operation on the target key of a read operation. These actions further include: determining whether a target address corresponding to the target key exists in a plurality of records included in the target bucket page. These actions further include: in response to a determination that the target address exists in the plurality of records, returning a target value from a corresponding target entry page based on the target address.

In still another aspect of the present disclosure, there is provided a computer program product. The computer program product is tangibly stored on a non-transient computer-readable storage medium and includes computer-executable instructions that, when executed, cause a machine to execute the method or process according to the embodiments of the present disclosure.

It should be noted that the SUMMARY is provided to introduce a series of concepts in a simplified manner, and these concepts will be further described in the DETAILED DESCRIPTION below. The SUMMARY is neither intended to identify key features or necessary features of the present disclosure, nor intended to limit the scope of the present disclosure.

BRIEF DESCRIPTION OF THE DRAWINGS

The above and other objectives, features, and advantages of the present disclosure will become more apparent from the more detailed description of embodiments of the present disclosure with reference to the drawings, in which.

Throughout all the drawings, the same or similar reference numerals generally represent the same or similar elements.

DETAILED DESCRIPTION

Figure 1:
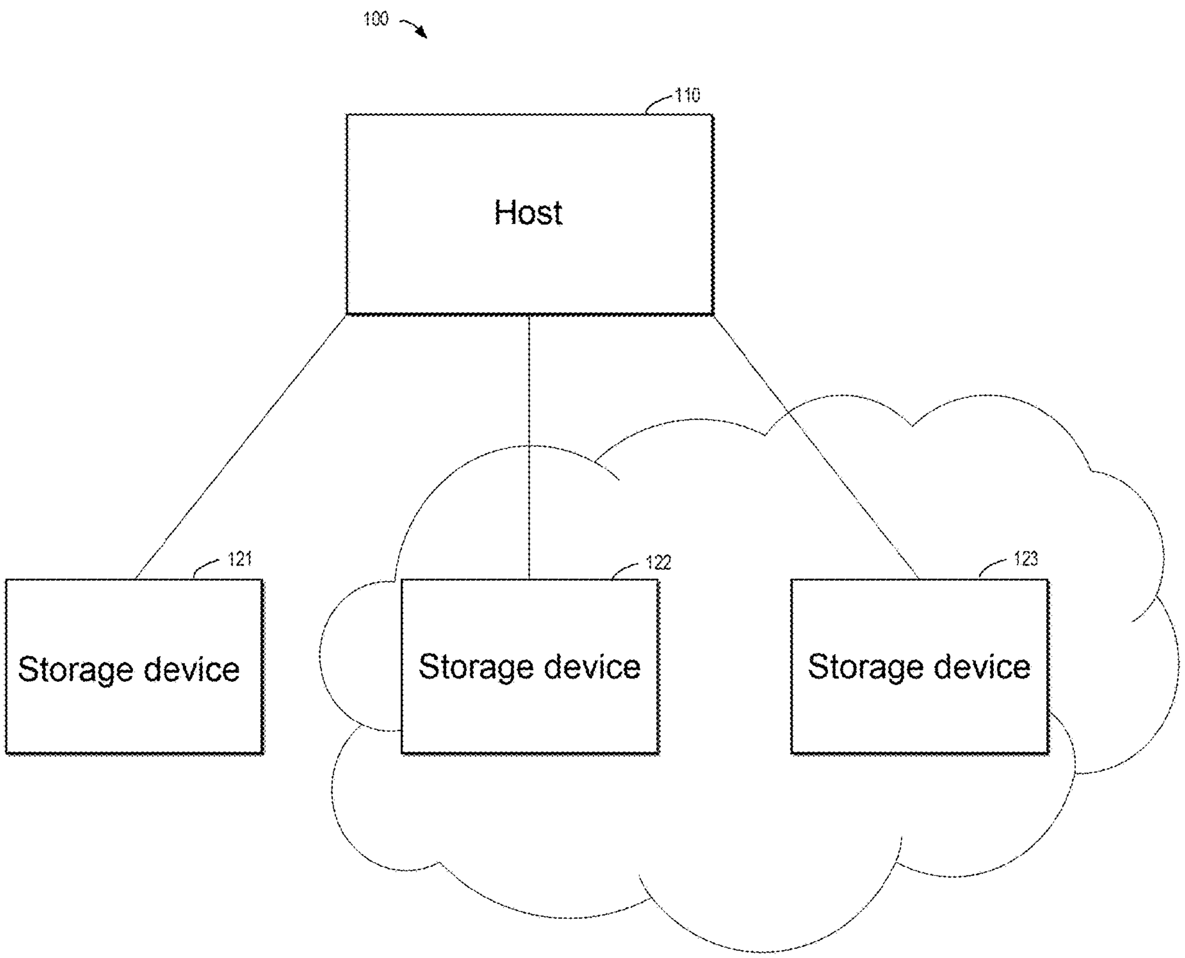
FIG. 1 illustrates a schematic diagram of an example environment in which a method and/or a process according to an embodiment of the present disclosure can be implemented.
Figure 2:
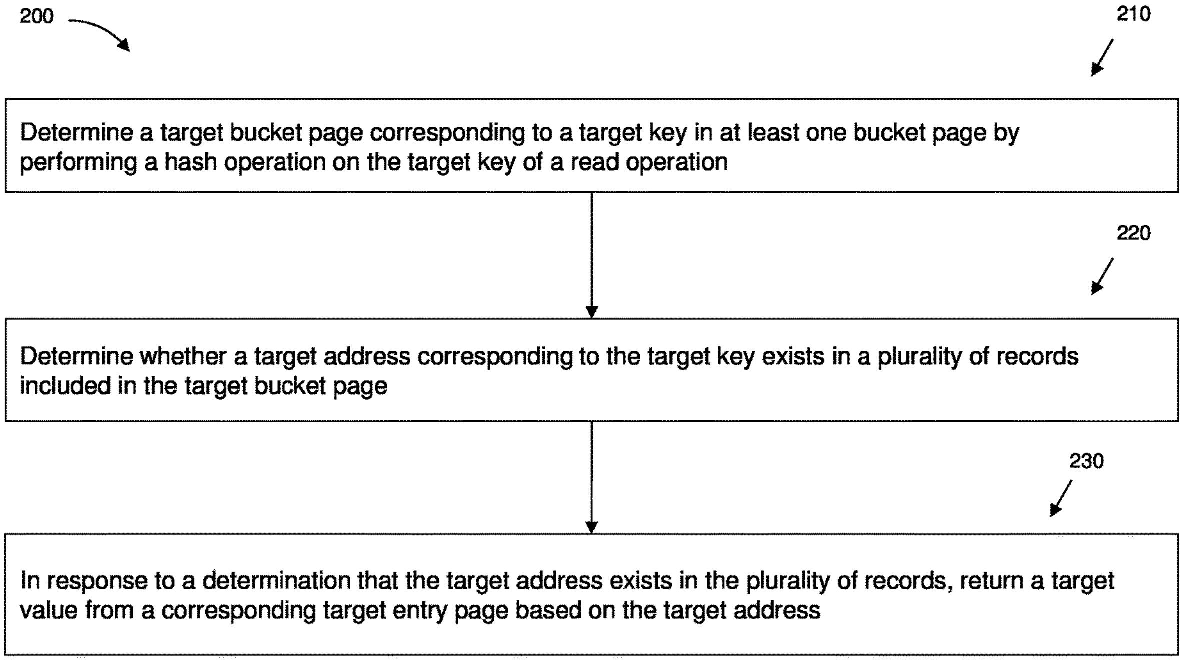
FIG. 2 illustrates a flow chart of a method for storage according to an embodiment of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will be described below in further detail with reference to the drawings. Although certain embodiments of the present disclosure are illustrated in the drawings, it should be understood that the present disclosure can be implemented in various forms and should not be construed as being limited to the embodiments set forth herein. Rather, these embodiments are provided for more thorough and complete understanding of the present disclosure. It should be understood that the drawings and embodiments of the present disclosure are for illustrative purposes only, and are not intended to limit the scope of protection of the present disclosure.

In the description of embodiments of the present disclosure, the term "include" and its variations should be understood as open-ended inclusion, i.e., "including but not limited to." The term "based on" should be understood as "based at least in part on." The term "one embodiment" or "the embodiment" should be understood as "at least one embodiment." The terms "first," "second," etc. may refer to different or the same objects, unless otherwise specifically indicated.

As mentioned above, in a storage system, a key-value pair for a volume ID and a storage status of a volume corresponding to the volume ID can be stored. In some related arts, key-value pairs are stored using an LSM (log-structured merge) tree-like database, where the LSM tree-like database structures data into parallel groups, and each group of data in the parallel groups is independent. Such a group layout has a natural advantage during a concurrent writing to different groups, but it shows deterioration in read scenarios. For example, in a read scenario, each parallel group (e.g., active tablet) needs to be locked to ensure consistency, and values corresponding to a given key value in each volume are aggregated at read time (depending on the characteristics of the LSM tree-like database). Such a lock causes a long chain and forces a wait for write. In addition, a B-tree layout in each of the plurality of groups causes lengthy page jumps. As a result, the storage performance deteriorates.

At least to solve at least some of the above and other potential problems, embodiments of the present disclosure provide a method for storage. The solution includes: determining a target bucket page corresponding to a target key in at least one bucket page by performing a hash operation on the target key of a read operation. The solution further includes: determining whether a target address corresponding to the target key exists in a plurality of records included in the target bucket page. The solution further includes: in response to a determination that the target address exists in the plurality of records, returning a target value from a corresponding target entry page based on the target address. In this way, there is provided a key-value storage layout based on hash and balanced tree which optimizes an access path of data, so that a length of a page jump can be reduced significantly, and then contentions for pages from read/write operations are effectively alleviated, thereby improving the storage performance.

The basic principles and some example implementations of the present disclosure will be illustrated below with reference to FIGS. 1-8. It should be understood that these example embodiments are provided merely to enable those skilled in the art to better understand and then implement embodiments of the present disclosure, and are not intended to impose any limitation to the scope of the present disclosure.

FIG. 1 illustrates a schematic diagram of an example environment 100 in which a method and/or a process according to an embodiment of the present disclosure can be implemented. As shown in FIG. 1, the sample environment 100 an example storage system that includes a host 110 and a plurality of storage devices (i.e., storage devices 121-123), where the storage devices 121-123 can be coupled to the host 110 (i.e., via a network or line) to achieve collaborative work.

According to the embodiment of the present disclosure, the host 110 may be a processing device with computing power for processing input/output IO requests. Applications can run on the host 110, such as applications that access or manage the storage devices 121-123, or applications that run based on data on the storage devices 121-123, and so on. The host 110 can send various requests for data on the storage devices 121-123 to the storage devices 121-123. For example, the host 110 can send to the storage devices 121-123 a request for retrieving target data, and query a read example.

By way of illustration and not limitation, the host 110 may include, but is not limited to, a computer, a server, a mobile device, etc., or a distributed computing environment that includes any one or more of the above devices. It should be noted that the examples of the host 110 and the applications described herein are illustrative only for ease of understanding and that embodiments of the present disclosure are not limited to these examples and may also include other different devices and applications.

According to the embodiment of the present disclosure, the storage devices 121-123 may be configured to store data. For example, the storage devices 121-123 can, for example, write new data in response to IO requests from the host 100. By way of illustration and not limitation, the storage devices 121-123 can be arranged locally or distributed, or combined, and are coupled together via a line or over network, etc. As shown in FIG. 1, the storage device 121 is arranged locally, and the storage devices 122 and 123 are arranged in the cloud.

It should be noted that the embodiment of the present disclosure does not specify the type, size, number, connection mode, etc., of the storage devices 121-123. In some embodiments, the storage devices 121-123 may include, but are not limited to, a hard disk drive (HDD), a solid state drive (SSD), a solid state hybrid drive (SSHD), etc.

It should be understood that, for purposes of explanation and illustration, a limited number of components, including a host (i.e., host 110) and three storage devices (i.e., storage devices 121-123), are shown in the example environment 100 for implementing the embodiment of the present disclosure. It should be understood that the embodiment of the present disclosure is not limited to this. For example, the example environment 100 may further include a cache (not shown) that is configured to store increment values of an underlying value, and so on.

The schematic diagram of the example environment 100 in which the method and/or process according to an embodiment of the present disclosure can be implemented is described above with reference to FIG. 1. A flow chart of a method 200 for storage according to an embodiment of the present disclosure will be described below with reference to FIG. 2. In order to effectively prevent storage performance degradation caused by long chains and lengthy page jumps, the method 200 for storage according to the embodiment of the present disclosure is proposed.

At block 210, a target bucket page corresponding to a target key is determined in at least one bucket page by performing a hash operation on the target key of a read operation. According to the embodiment of the present disclosure, a target key indicated by an IO request is hashed to a corresponding target bucket page of one or more bucket pages using a hash function. In this way, a target bucket page corresponding to the target key can be quickly located to obtain address information of a corresponding target entry page. In addition, such a hash-based bucket page layout facilitates the execution of concurrent operations.

At block 220, whether a target address corresponding to the target key exists in a plurality of records included in the target bucket page is determined. According to the embodiment of the present disclosure, each bucket page in one or more bucket pages includes a plurality of records (also referred to as slots), each record indicating a corresponding key and an address of an entry page corresponding to the key. A target address corresponding to the target key is searched out in the plurality of records included in the target bucket page.

At block 230, in response to a determination that the target address exists in the plurality of records, a target value is returned from a corresponding target entry page based on the target address. According to the embodiment of the present disclosure, in the plurality of records included in the target bucket page, when the target address corresponding to the target key is searched out, the corresponding target entry page can be addressed according to the target address searched out, and then the target value corresponding to the target key is retrieved from the target entry page.

According to the embodiment of the present disclosure, there is provided a key-value storage layout based on hash and balanced tree which optimizes an access path of data, so that a length of a page jump can be reduced significantly, and then contentions for pages from read/write operations are effectively alleviated, thereby improving the storage performance. The key-value storage layout based on hash and balanced tree according to the embodiment of the present disclosure will be described below in further detail.

Figure 3:
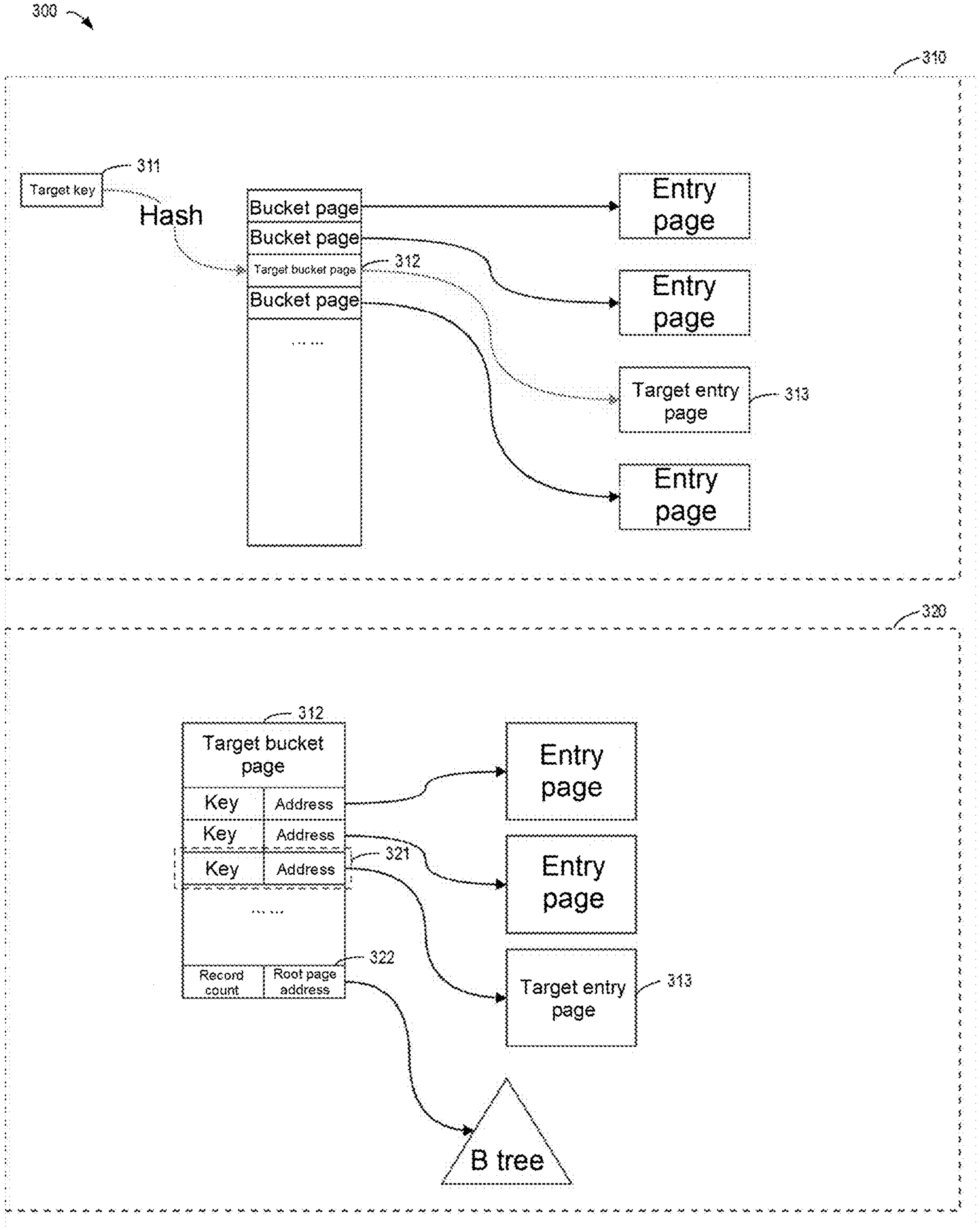
FIG. 3 illustrates an example of key-value storage layout based on hash and balanced tree according to an embodiment of the present disclosure.

FIG. 3 illustrates an example 300 of a key-value storage layout based on hash and balanced tree according to an embodiment of the present disclosure. An upper half part 310 of the example 300 shows a correlation between keys and bucket pages. By way of illustration and not limitation, a target bucket page 312 corresponding to a target key 311 is determined from a plurality of bucket pages based on a key-to-bucket-page hash mapping, where the determined target bucket page includes address information of a target entry page 313 for addressing to the target entry page 313.

A lower half part 320 of the example 300 of the key-value storage layout based on hash and balanced tree in FIG. 3 shows a correlation between records (also known as slots) in the bucket page and the entry page. With the target bucket page 312 as an example of the bucket page, the target bucket corresponding addresses, the address indicating an entry page corresponding to a key in an entry. In some embodiments, the keys and the addresses in each of the records correspond one to one.

According to the embodiment of the present disclosure, after the target key 311 is hashed to the target bucket page 312, a target address corresponding to the target key 311 is searched out in the plurality of records in the target bucket page 312. For example, when the target key 311 indicated by an IO request matches a record 321 (or a key in the record 321) in the target bucket page, an address in the record 321 is determined as the target address, based on which the corresponding target entry page 313 can be addressed. A target value is then returned from the target entry page 313. How to return the target value from the target entry page 313 will be described in further detail below.

In some embodiments, an exclusive lock for the target bucket page 312 and the target entry page 313 may be requested based on a read operation associated with the target key 311. When an operation holds an exclusive lock (also known as a write lock) for a resource, no other operation is allowed to access or take further action on the resource, which ensures the consistency and integrity of data during the operation. Also, the target value can be generated by aggregating increment values corresponding to the target key 311 from a cache to a disk. Whenever an underlying value is updated, updated increment values are not immediately refreshed to the disk, but aggregation of these increment values will be delayed. One or more increment values of the underlying value can be cached in a log or storage system (e.g., a cache) and aggregated in response to, for example, a read operation or a request for an exclusive lock for a page.

In some embodiments, a shared lock for the target bucket page 312 and the target entry page 313 may be requested based on a write operation associated with the target key 311. When an operation holds a shared lock for a resource (also known as a read lock), other operations can also obtain the shared lock for the resource, so that a plurality of operations are allowed to access or take further action on the resource at the same time, which facilitates the execution of parallel operations. Also, the increment values corresponding to the target key 311 can be stored in the cache separately, and the increment values stored in the cache are aggregated in response to, for example, the read operation or other IO requests. When the underlying value needs to be updated, updated increment value are not immediately refreshed to the disk, but can be cached in the log or storage system (for example, a cache). The increment values stored in the cache are aggregated in response to a predetermined trigger condition.

Through the above mechanism, the embodiment of the present disclosure can handle contentions between flush instances (for example, flush writes). As mentioned above, the key-value store based on hash and balanced tree according to the embodiment of the present disclosure may store a key-value pair for a volume ID and a storage status of a volume corresponding to the volume ID, and the strong consistency of the underlying value is not required in this usage scenario. That is, each flush instance is concerned with writing “increments” of the storage status of the volume to the key-value store, so the aggregation of these increments can be delayed. Therefore, the exclusive lock is not necessary in this case, but the shared lock is necessary to complete the insertion of such “increments” into the key-value store. Since each flush instance holds a shared lock for the page, there is no wait between these shared lock operations, so lock contentions are mitigated.

In a related parallel group solution, there are a plurality of groups, and pages in each group are organized in a B-tree, so there are a plurality of layers. According to the key-value storage layout based on hash and balanced tree and a lock mechanism of the embodiment of the present disclosure, only a single group (at the order of magnitude of 1) for bucket pages and entry pages exists. In this way, the length of chains and page jumps is reduced to a relatively small size, thus improving the storage performance.

In some embodiments, in the plurality of records in the target bucket page 312, the last record may be used to indicate the total number (i.e., record count) of all records in the bucket page. Also, the last record can include a root page address 322 to indicate a balanced tree. An example of the balanced tree according to the embodiment of the present disclosure may be a B tree. It should be understood that this is exemplary rather than restrictive, and that other different tree structures can also be used. When a hash conflict of a bucket page is greater than a certain threshold, in the embodiment of the present disclosure, a balanced tree structure can be utilized to mitigate such conflicts between the plurality of records. Thus, a linear array with a configuration of a suitable hash bucket size can be used to handle most hash conflicts, while the more extreme cases are left to the balanced tree structure, so that better performance and coverage trade-offs can be provided. It should be understood that the selection of the last record in the plurality of records to indicate the record count and the root page address of the balanced tree is exemplary rather than restrictive, and that other records can also be selected.

Figure 4:
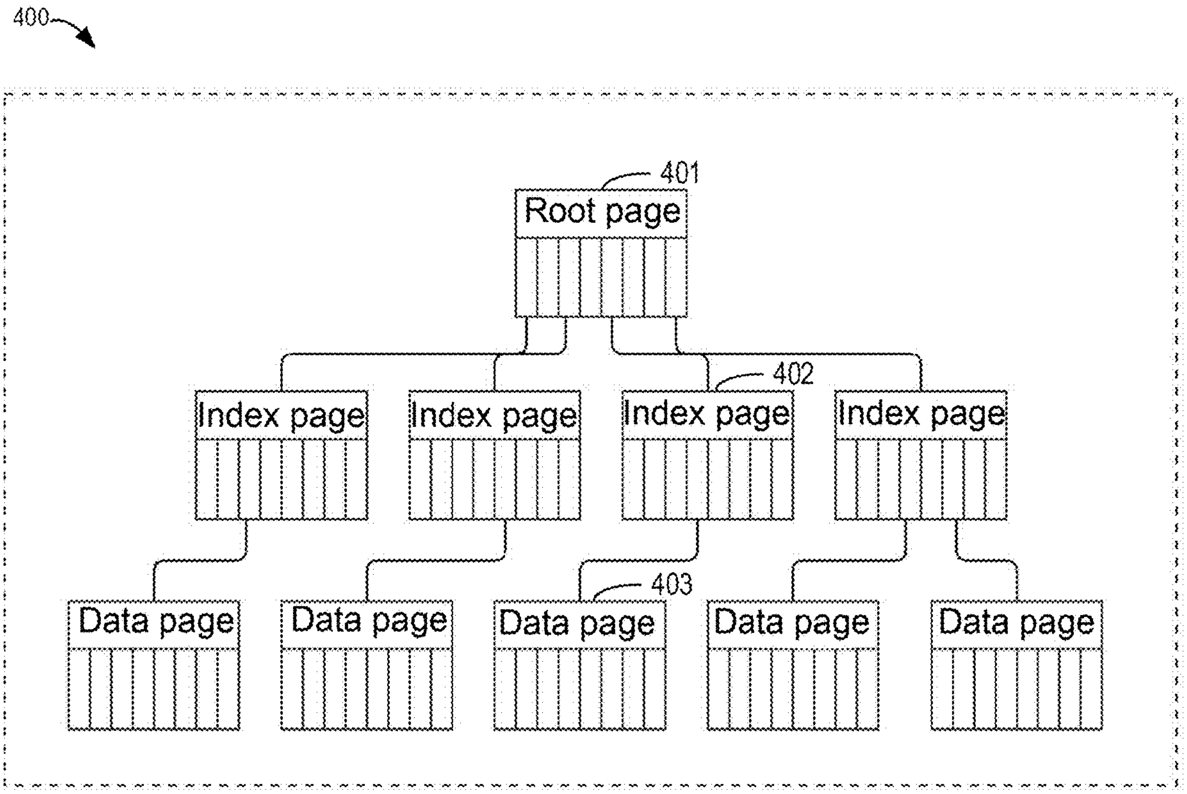
FIG. 4 illustrates a layout example of a balanced tree indicated by a root page address according to an embodiment of the present disclosure.

In some embodiments, in response to a determination that the target address 321 does not exist in the plurality of records (from the first record to the second-to-last record) included in the target bucket page 312, the balanced tree may be identified by the root page address 322 in the last record. FIG. 4 illustrates a layout example 400 of a balanced tree indicated by the root page address 322 according to an embodiment of the present disclosure. As shown in FIG. 4, the layout example 400 of the balanced tree includes a root page 401, a plurality of index pages, and a plurality of data pages. It should be understood that the layout example 400 shown in FIG. 4 is only exemplary rather than restrictive.

In some embodiments, a target index page such as an index page 402 corresponding to the target key 311 can be determined in at least one index page in the balanced tree. In addition, based on a target index in the determined index page 402, a corresponding target data page such as a data page 403 can be located or addressed to obtain desired data.

Figure 5:
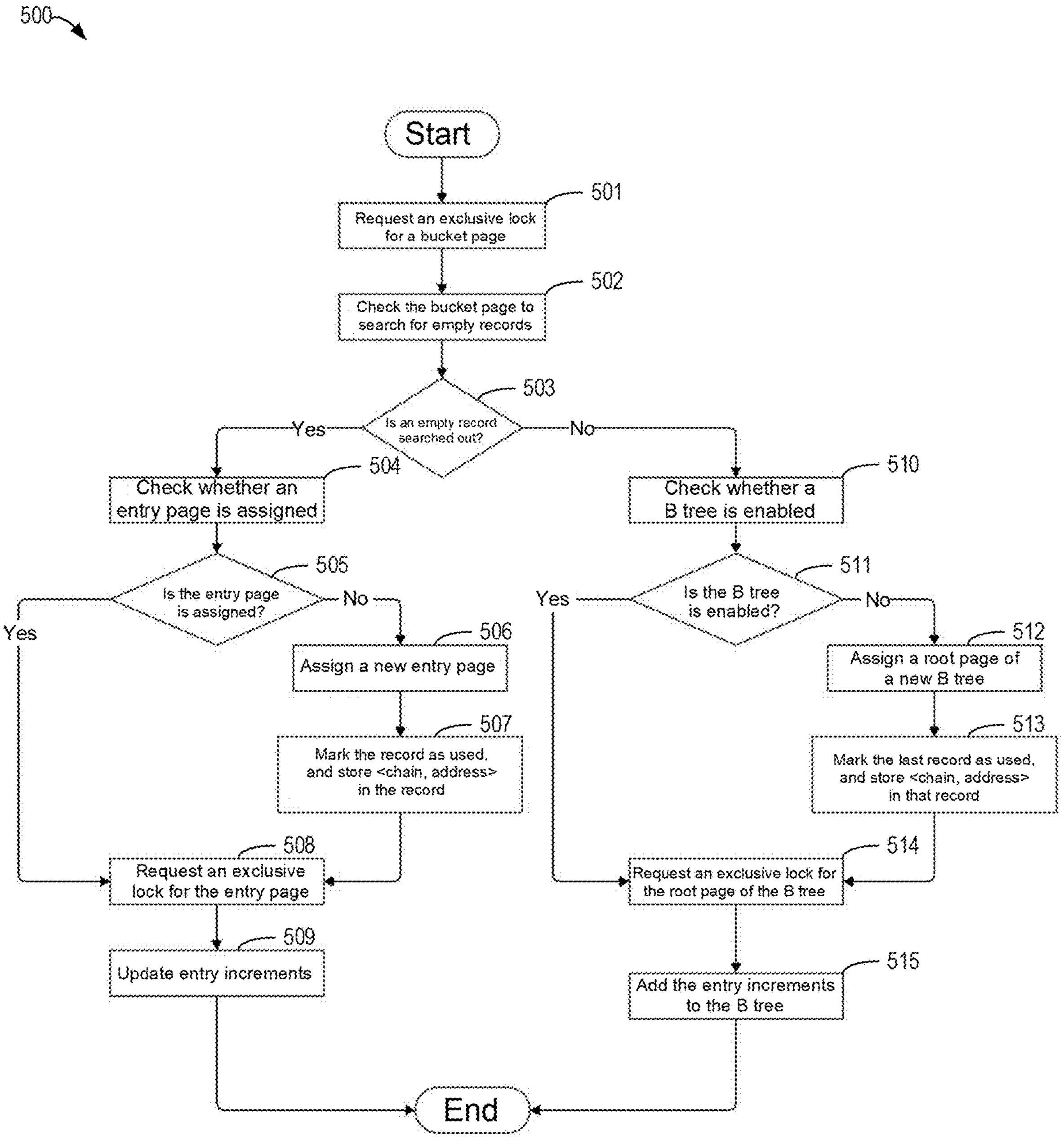
FIG. 5 illustrates a schematic diagram of a process of creating an entry according to an embodiment of the present disclosure.

FIG. 5 illustrates a schematic diagram of a process 500 of creating an entry according to an embodiment of the present disclosure. The process starts at block 501, an exclusive lock for a bucket page is requested. At block 502, the bucket page is checked to search for empty records or records that have been released (for example, marked as FREE). At block 503, in response to an available record (also known as an available slot) having been searched out, the process proceeds to block 504 to check whether an entry page is assigned to the record. At block 505, in response to the entry page having been assigned, the process proceeds to block 508 to request an exclusive lock for the entry page, and then entry increments are updated at block 509. At block 505, in response to no entry page being assigned, the process proceeds to block 506 to assign a new entry page to the record from a FreeBin of a free page, and at block 507, the record is marked as used and a key and an address of the assigned entry page are stored in the record, and then operations at blocks 508 and 509 are performed respectively.

At block 503, in response to no available records being searched out, the process proceeds to block 510 to check whether a balanced tree is enabled, that is, to check the last record on the bucket page or whether pages of the balanced tree are assigned. At block 511, in response to the balanced tree having been enabled or pages of the balanced tree having been assigned, the process proceeds to block 514 to request an exclusive lock for a root page of the balanced tree, and then at block 515, entry increments are added to the balanced tree. At block 511, in response to the balanced tree not enabled or the pages of the balanced tree not assigned, the process proceeds to block 512 to assign a root page of a new B tree from the FreeBin; at block 513, the last record of the bucket page is marked as used, and a key and an address of the root page of the assigned balanced tree are stored in the last record; and then operations at blocks 514 and 515 are performed respectively. The process ends.

Figure 6:
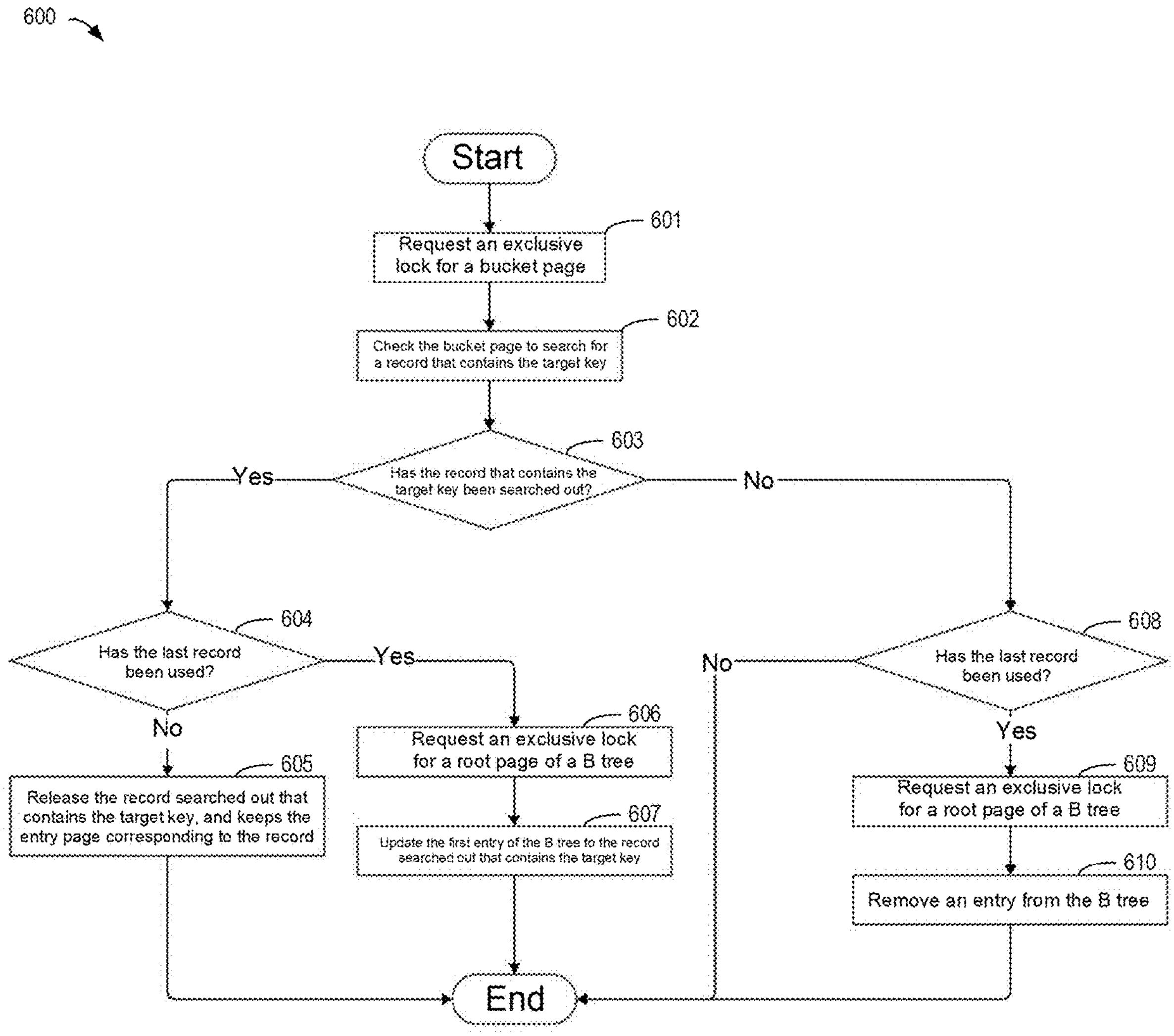
FIG. 6 illustrates a schematic diagram of a process of removing an entry according to an embodiment of the present disclosure.

FIG. 6 illustrates a schematic diagram of a process 600 of removing an entry according to an embodiment of the present disclosure. The process starts at block 601, an exclusive lock for a bucket page is requested. At block 602, the bucket page is iteratively checked to search for a record that has been used and contains a target key, the target key corresponding to an entry desired to be removed. At block 603, in response to a record containing the target key having been searched out, the process proceeds to block 604 to determine whether the last entry on the bucket page has been used. In response to the last entry having not been used, at block 605, the record containing the target key (e.g., marked as FREE) that is searched out is released, and an entry page corresponding to the record is kept. At block 604, in response to the last entry of the bucket page having been used, the process proceeds to block 604 to request an exclusive lock for a root page of a balanced tree, and then update the first entry of the balanced tree to the record containing the target key that is searched out. In some embodiments, the balanced tree can be identified based on a root page address of the balanced tree included in the last record, an exclusive lock for the root page of the balanced tree can be requested, and then index or address information, as well as entry data, of the first entry in the balanced tree can be populated in the record containing the target key that is searched out and the entry page corresponding to the record.

At block 603, in response to no record containing the target key being searched out, the process proceeds to block 608 to determine whether the last entry on the bucket page has been used. At block 609, an exclusive lock for the root page of the balanced tree is requested, and then at block 610, a removal operation is performed on the entry desired to be removed from the balanced tree. The process ends.

Figure 7:
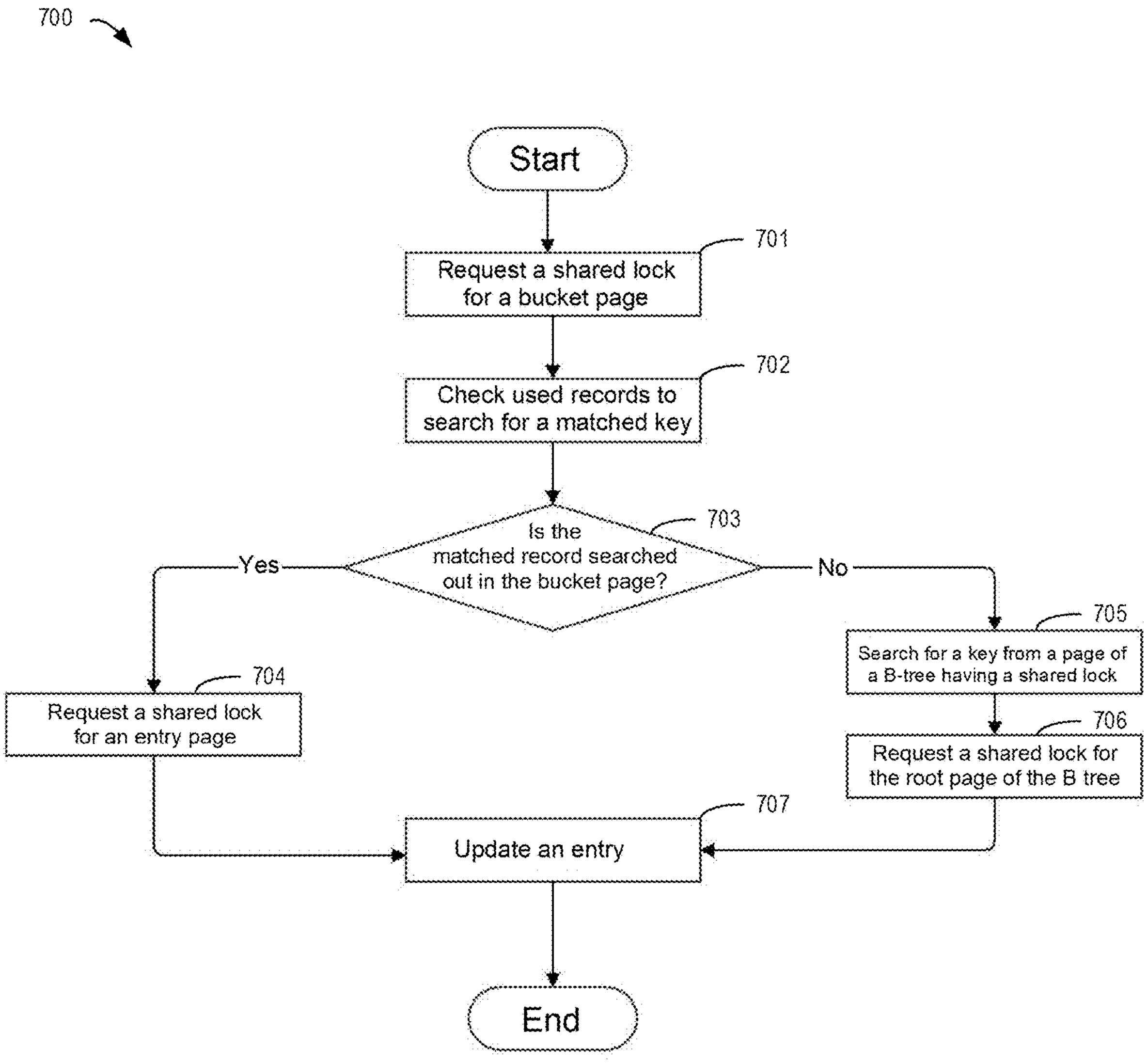
FIG. 7 illustrates a schematic diagram of a process of updating an entry according to an embodiment of the present disclosure.

FIG. 7 illustrates a schematic diagram of a process 700 of updating an entry according to an embodiment of the present disclosure. The process starts at block 701, a shared lock for a bucket page is requested. At block 702, the bucket page is iteratively checked to search for a matched key in entries that have been used, the key corresponding to an entry desired to be updated. At block 703, in response to a matched record having been searched out in the bucket page, the process proceeds to block 704 to request a shared lock for a corresponding entry page, and then an entry is updated at block 707. In some embodiments, at block 707, the entry may be marked with a "reload-on-write" mark.

At block 703, in response to no matched record being searched out in the bucket page, the process proceeds to block 705 to request a shared lock for a root page of a balanced tree and search for a matched key from the root page of the balanced tree that has the shared lock, and then operations at block 707 are performed respectively. The process ends.

According to the embodiments of the present disclosure, the plurality of keys may include, but are not limited to, a plurality of volume identifiers, and each of the plurality of volume identifiers may correspond to a storage status of a corresponding volume; In addition, a size of the bucket page corresponds to a size limit (e.g., 778K) for a key identifier. A life-cycle limit of a system object is 778K, that is, a system can hold a maximum of 778K objects at the same time. In combination with the limit and an appropriate hash bucket size (778K), the hashing conflicts can be controlled to a limited proportion in most scenarios.

Figure 8:
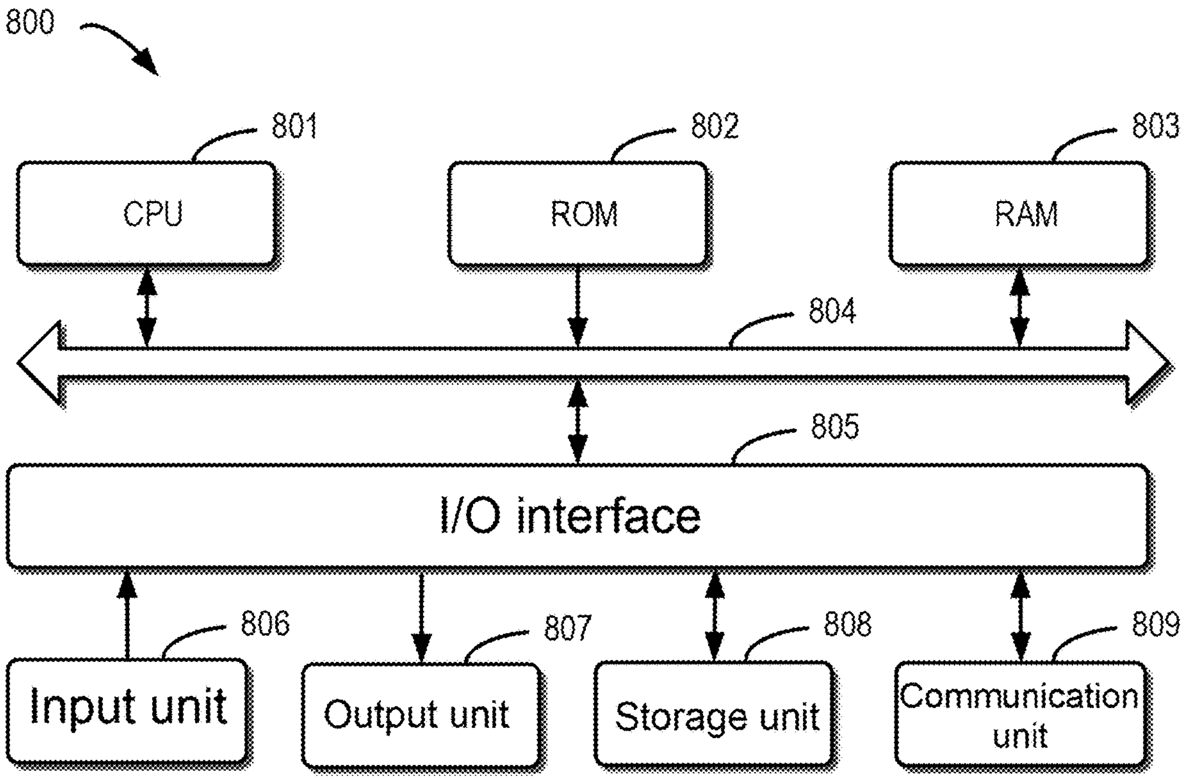
FIG. 8 illustrates a schematic block diagram of an example device that can be used to implement embodiments of the present disclosure.

FIG. 8 illustrates a schematic block diagram of an example device 800 that may be used for implementing some embodiments according to the present disclosure. As shown in FIG. 8, the device 800 includes a central processing unit (CPU) 801 that may perform various appropriate actions and processing according to computer program instructions stored in a read-only memory (ROM) 802 or computer program instructions loaded from a storage unit 808 to a random access memory (RAM) 803. Various programs and data required for the operation of the device 800 may also be stored in the RAM 803. The CPU 801, the ROM 802, and the RAM 803 are connected to each other through a bus 804. An input/output (I/O) interface 805 is also connected to the bus 804.

A plurality of components in the device 800 are connected to the I/O interface 805, including: an input unit 806, such as a keyboard and a mouse; an output unit 807, such as various types of displays and speakers; the storage unit 808, such as a magnetic disk and an optical disc; and a communication unit 809, such as a network card, a modem, and a wireless communication transceiver. The communication unit 809 allows the device 800 to exchange information/data with other devices via a computer network, such as the Internet, and/or various telecommunication networks.

The various processes and processing described above, such as the method 200, may be performed by the processing unit 801. For example, in some embodiments, the method 200 may be implemented as a computer software program that is tangibly included in a machine-readable medium such as the storage unit 808. In some embodiments, some or all of the computer program may be loaded and/or installed onto the device 800 via the ROM 802 and/or the communication unit 809. When the computer program is loaded into the RAM 803 and executed by the CPU 801, one or more actions of the method 200 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

Computer program instructions for performing the operations of the present disclosure may be assembly instructions, Instruction Set Architecture (ISA) instructions, machine instructions, machine-related instructions, microcode, firmware instructions, state setting data, or source code or object code written in any combination of one or more programming languages, including object-oriented programming languages such as Smalltalk and C++, and conventional procedural programming languages such as "C" language or the like. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FAGAN), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or other programmable data processing apparatuses to produce a machine, such that these instructions, when executed by the processing unit of the computer or other programmable data processing apparatuses, produce means (e.g., specialized circuitry) for implementing the functions/acts specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored thereon includes an article of manufacture that includes instructions that implement various aspects of the functions/actions specified in one or more blocks in the flow charts and/or block diagrams.

The computer-readable program instructions may also be loaded onto a computer, other programmable data processing apparatuses, or other devices, such that a series of operational steps are performed on the computer, other programmable data processing apparatuses, or other devices to produce a computer-implemented process, such that the instructions executed on the computer, other programmable data processing apparatuses, or other devices implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

The invention claimed is:

1. A method for storage, comprising:

determining a target bucket page corresponding to a target key in at least one bucket page by performing a hash operation on the target key of a read operation;

determining whether a target address corresponding to the target key exists in a plurality of records included in the target bucket page; and in response to a determination that the target address exists in the plurality of records, returning a target value from a corresponding target entry page based on the target address, by:

requesting an exclusive lock for the target bucket page and the target entry page based on the read operation;

generating the target value by aggregating increment values corresponding to the target key from a cache to a disk;

requesting and holding a shared lock for the target bucket page and the target entry page based on a write operation associated with the target key, wherein the shared lock is held by multiple operations at the same time and allows the multiple operations to access the target bucket page and the target entry page in parallel; and storing the increment values corresponding to the target key in the cache separately, and aggregating the increment values stored in the cache in response to being requested.

2. The method according to claim 1, wherein the plurality of records are arranged linearly, and the last record in the plurality of records comprises a record count for the plurality of records and a root page address of a balanced tree to indicate the balanced tree.

3. The method according to claim 2, further comprising:

in response to a determination that the target address does not exist in the plurality of records, identifying the balanced tree based on the root page address;

determining a target index page corresponding to the target key in at least one index page in the balanced tree; and navigating to a corresponding target data page based on a target index in the target index page.

4. The method according to claim 1, further comprising:

requesting an exclusive lock for the target bucket page;

determining whether an empty record that has not been used exists in the plurality of records; and in response to a determination that the empty record exists in the plurality of records, requesting an exclusive lock for an entry page corresponding to the empty record for creating a new entry.

5. The method according to claim 1, further comprising:

requesting an exclusive lock for the target bucket page;

determining whether a record that has been used and contains the target key exists in the plurality of records;

in response to a determination that the record exists in the plurality of records, determining whether the last record in the plurality of records has been used;

in response to a determination that the last record has not been used, releasing the record for removal of entries, wherein an entry page corresponding to the record is retained.

6. The method according to claim 5, further comprising:

in response to a determination that the last record has been used, identifying the balanced tree based on the root page address of the balanced tree included in the last record; and requesting an exclusive lock for a root page of the balanced tree; and populating an index and data of the first entry in the balanced tree to the record and the entry page corresponding to the record.

7. The method according to claim 1, wherein the plurality of keys comprise a plurality of volume identifiers, each of the plurality of volume identifiers corresponding to a storage status of a corresponding volume; and a size of the at least one bucket page corresponds to a size limit for a key identifier.

8. An electronic device, comprising:

a processor; and a memory coupled to the processor and storing instructions that, when executed by the processor, cause the device to perform actions comprising:

determining a target bucket page corresponding to a target key in at least one bucket page by performing a hash operation on the target key of a read operation;

determining whether a target address corresponding to the target key exists in a plurality of records included in the target bucket page; and in response to a determination that the target address exists in the plurality of records, returning a target value from a corresponding target entry page based on the target address, by:

requesting an exclusive lock for the target bucket page and the target entry page based on the read operation;

generating the target value by aggregating increment values corresponding to the target key from a cache to a disk;

requesting and holding a shared lock for the target bucket page and the target entry page based on a write operation associated with the target key, wherein the shared lock is held by multiple operations at the same time and allows the multiple operations to access the target bucket page and the target entry page in parallel; and storing the increment values corresponding to the target key in the cache separately, and aggregating the increment values stored in the cache in response to being requested.

9. The electronic device according to claim 8, wherein the plurality of records are arranged linearly, and the last record in the plurality of records comprises a record count for the plurality of records and a root page address of a balanced tree to indicate the balanced tree.

10. The electronic device according to claim 9, wherein the actions further comprise:

in response to a determination that the target address does not exist in the plurality of records, identifying the balanced tree based on the root page address;

determining a target index page corresponding to the target key in at least one index page in the balanced tree; and navigating to a corresponding target data page based on a target index in the target index page.

11. The electronic device according to claim 8, wherein the actions further comprise:

requesting an exclusive lock for the target bucket page;

determining whether an empty record that has not been used exists in the plurality of records; and in response to a determination that the empty record exists in the plurality of records, requesting an exclusive lock for an entry page corresponding to the empty record for creating a new entry.

12. The electronic device according to claim 8, wherein the actions further comprise:

requesting an exclusive lock for the target bucket page;

determining whether a record that has been used and contains the target key exists in the plurality of records;

in response to a determination that the record exists in the plurality of records, determining whether the last record in the plurality of records has been used;

in response to a determination that the last record has not been used, releasing the record for removal of entries, where an entry page corresponding to the record is retained.

13. The electronic device according to claim 12, wherein the actions further comprise:

in response to a determination that the last record has been used, identifying the balanced tree based on the root page address of the balanced tree included in the last record; and requesting an exclusive lock for a root page of the balanced tree; and populating an index and data of the first entry in the balanced tree to the record and the entry page corresponding to the record.

14. The electronic device according to claim 8, wherein the plurality of keys comprise a plurality of volume identifiers, each of the plurality of volume identifiers corresponding to a storage status of a corresponding volume; and a size of the at least one bucket page corresponds to a size limit for a key identifier.

15. A computer program product having a non-transitory computer readable medium which stores a set of instructions to perform storage; the set of instructions, when carried out by computerized circuitry, causing the computerized circuitry to perform a method of:

determining a target bucket page corresponding to a target key in at least one bucket page by performing a hash operation on the target key of a read operation;

determining whether a target address corresponding to the target key exists in a plurality of records included in the target bucket page; and in response to a determination that the target address exists in the plurality of records, returning a target value from a corresponding target entry page based on the target address, by:

requesting an exclusive lock for the target bucket page and the target entry page based on the read operation;

generating the target value by aggregating increment values corresponding to the target key from a cache to a disk;

requesting and holding a shared lock for the target bucket page and the target entry page based on a write operation associated with the target key, wherein the shared lock is held by multiple operations at the same time and allows the multiple operations to access the target bucket page and the target entry page in parallel; and storing the increment values corresponding to the target key in the cache separately, and aggregating the increment values stored in the cache in response to being requested.

* * * * *